United States Patent [19]

Brownell et al.

[11] 4,057,122
[45] Nov. 8, 1977

[54] CONTROL ARRANGEMENT FOR A VEHICLE WITH AN ADJUSTABLE SEAT

[75] Inventors: Roy D. Brownell; Dean M. Lawrence, both of Aurora, Ill.

[73] Assignee: Caterpillar Tractor Co., Peoria, Ill.

[21] Appl. No.: 702,545

[22] Filed: July 6, 1976

[51] Int. Cl.² .............................................. B60K 26/00
[52] U.S. Cl. ................................ 180/77 S; 180/77 H; 297/330; 297/347; 297/217
[58] Field of Search .............. 180/77 S, 77 H, 77 HT, 180/89.12, 89.13; 297/71, 330, 347, 348, 361, 355, 362; 248/393, 394

[56] References Cited

U.S. PATENT DOCUMENTS

| | | | |
|---|---|---|---|
| 2,849,051 | 8/1958 | Streeter | 297/361 X |
| 3,182,605 | 5/1965 | Brasher | 180/77 S |
| 3,805,908 | 4/1974 | Thompson | 180/89.1 X |

Primary Examiner—Joseph F. Peters, Jr.
Assistant Examiner—Donn McGiehan
Attorney, Agent, or Firm—James R. Bell

[57] ABSTRACT

A control arrangement is provided for a vehicle having an adjustable seat mounted on a fixed frame of the vehicle for permitting the selective movement of the seat relative to certain ones of the controls, such as the foot pedals. The control arrangement includes a manually actuatable control valve mounted to one side of the set for adjustable movement therewith between predetermined minimum and maximum positions relative to the fixed frame. A plurality of flexible hydraulic hoses are connected to the control valve and extend therefrom in a circumlocutious route to the frame so as to provide the hoses with a sufficient length to accommodate the movement of the valve between its minimum and maximum positions without the hoses being kinked or placed in tension.

3 Claims, 3 Drawing Figures

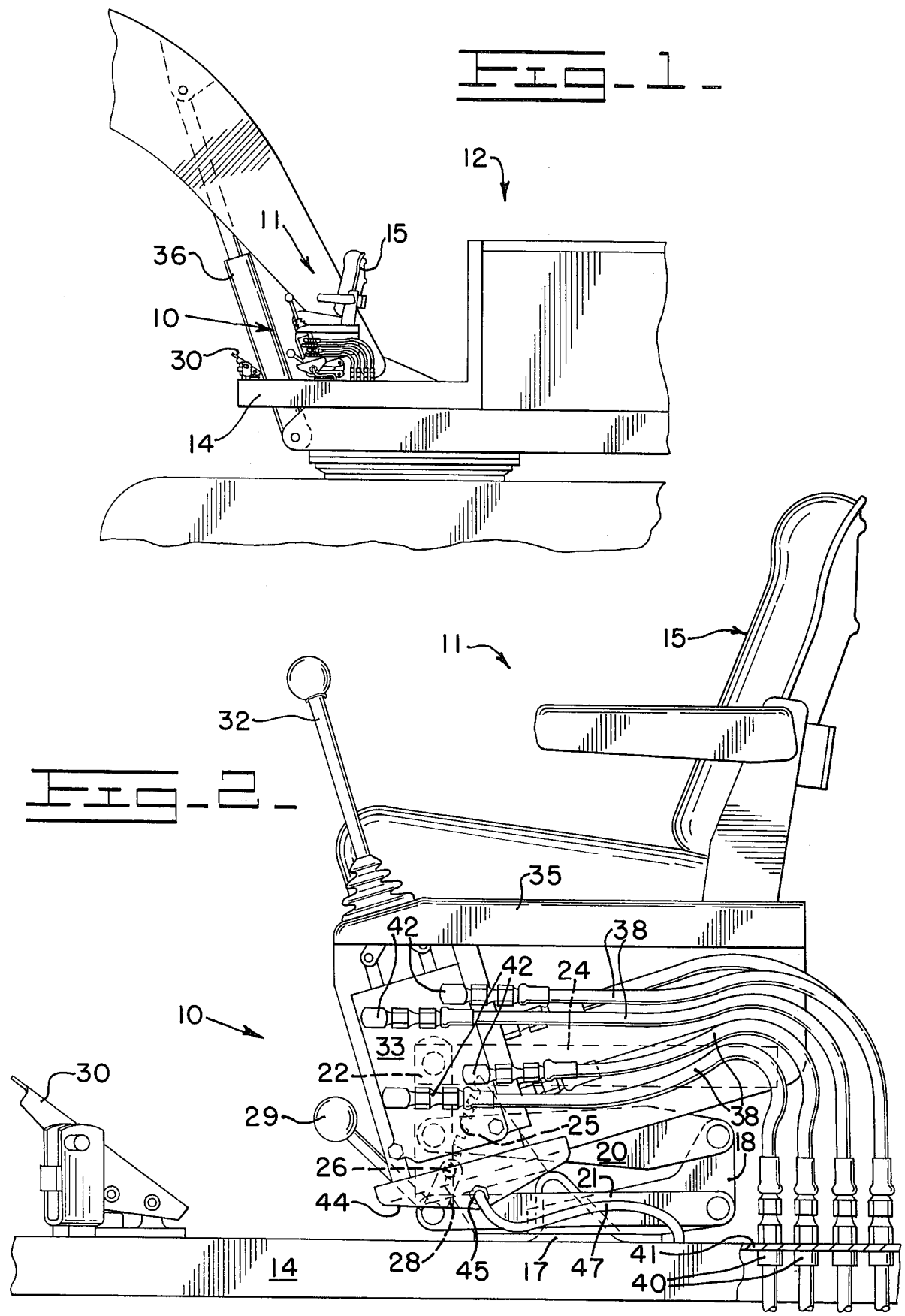

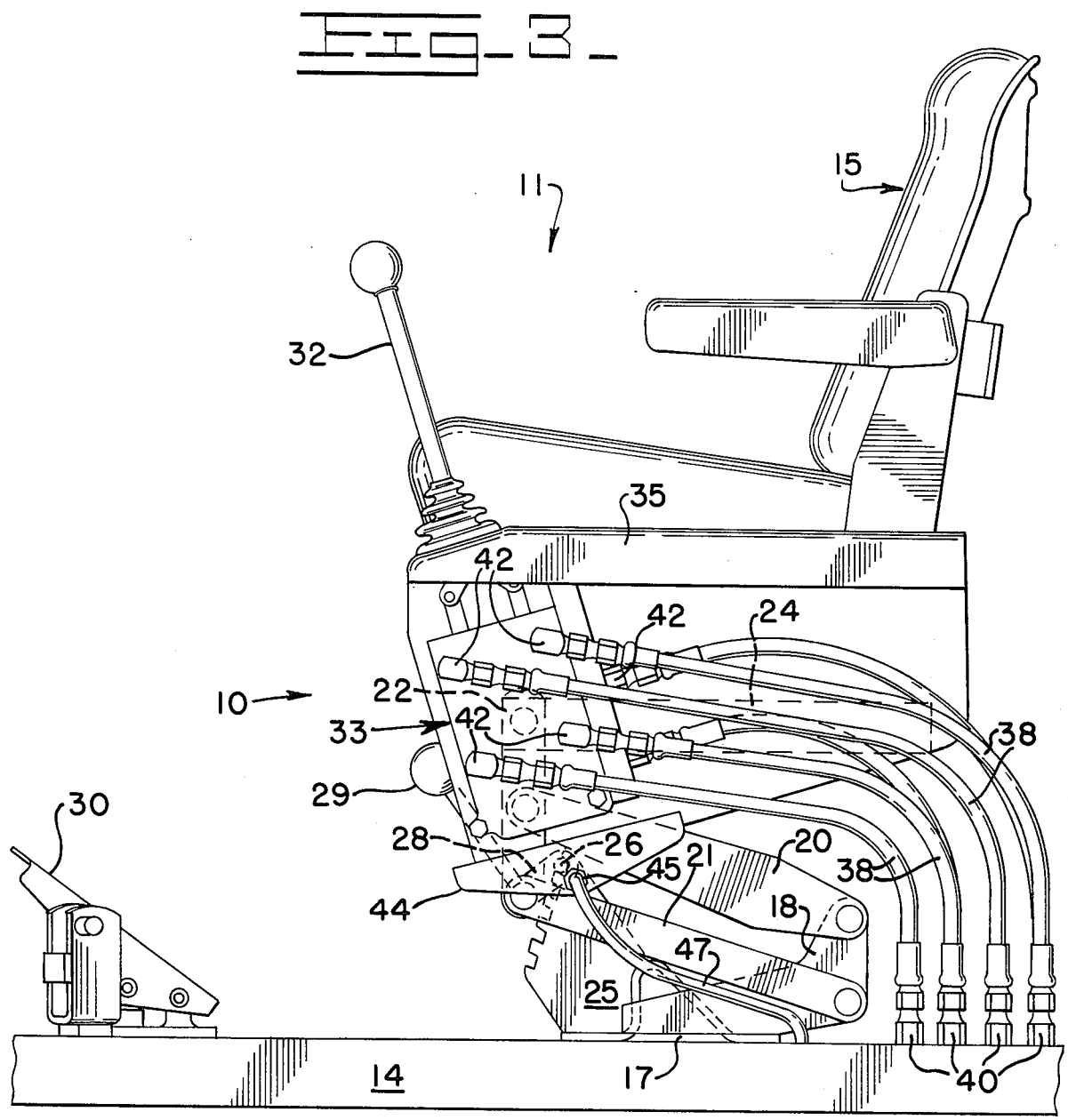

CONTROL ARRANGEMENT FOR A VEHICLE WITH AN ADJUSTABLE SEAT

BACKGROUND OF THE INVENTION

This invention relates to a control arrangement for a vehicle which is equipped with an adjustable seat so as to permit certain ones of the controls to move with the seat when the seat is being adjusted to obtain a comfortable operating position with respect to certain of the other controls.

Due to the vast differences in the physical sizes of operators for earthmoving equipment, such as hydraulic excavators and the like, such vehicles are normally provided with mechanisms for adjusting the height and/or longitudinal position of the seat so that the operator can position himself in a comfortable operating position with respect to certain ones of the vehicle controls, such as the foot pedals. However, what may be a comfortable position for operating the foot controls may be an uncomfortable position for operating the hand controls for a particular operator.

Therefore, it would be desirable to have the hand controls movable relative to the foot controls.

SUMMARY AND OBJECTS OF THE INVENTION

Accordingly, it is an object of this invention to provide a control arrangement for mounting the hand controls to one side of an adjustable operator seat so that the operator can adjust the seat relative to the foot controls without affecting his relative position to such hand controls.

Another object of this invention is to provide an arrangement for the placement of a plurality of flexible hydraulic hoses connecting a movable hydraulic control valve with the fixed frame of the vehicle which prevents the kinking and undue stressing of such hoses.

Other objects and advantages of the present invention will become more readily apparent upon reference to the accompanying drawings and following description.

BRIEF DESCRIPTION OF THE DRAWINGS

FIG. 1 is a fragmentary left side elevational view of the present control arrangement in association with a operator station of a hydraulic excavator vehicle.

FIG. 2 is an enlarged side elevational view of the operator station of FIG. 1 with the seat thereof shown in its lowermost position.

FIG. 3 is an enlarged side elevational view similar to FIG. 2, but showing the seat in its uppermost position.

DESCRIPTION OF THE PREFERRED EMBODIMENT

Referring more particularly to the drawings, a control arrangement embodying the principles of the present invention is generally indicated at 10 in association with an operator station 11 of an earthmoving vehicle, such as a hydraulic excavator generally indicated by the reference numeral 12. The operator station 11 includes a fixed frame 14 carried by the vehicle upon which an adjustable operator seat 15 is mounted. While it will be appreciated that the present invention may be used with any well known adjustable seat, the seat shown herein includes a base 17, as shown in FIGS. 2 and 3, mounted to the fixed frame 14. A pair of upright brackets 18, one shown, are provided on the base and extend upwardly therefrom. A pair of upper links 20 and a pair of lower links 21, one of each shown, are pivotally connected in spaced apart relation to the brackets 18. The opposite ends of the respective links are pivotally connected in similar spaced apart relationship to a swing link 22, thereby describing a parallelogram-type linkage mechanism. The upper end of the swing link 22 is pivotally connected to a lower support frame 24 of the seat.

A notched height position member 25 is also carried by the base for receiving a height select pin 26 in a given one of the notches of such member. The height select pin 26 is attached to one end of an actuating arm 28. The other end of the arm is pivotally mounted to the adjacent end of the lower links 21 and the swing link 22. The actuating arm also has attached thereto a lever 29 to permit the selective pivoting of the arm for adjusting the height select pin to a given notch. A spring, not shown, may be used for holding the height select pin within a selected one of the notches of the height position member to keep the seat at a desired height level.

The vehicle 12 includes numerous controls in the operator station for operatively controlling the vehicle including a foot control pedal 30 mounted on the frame 14 ahead of the seat 15. The vehicle also includes hand controls, such as indicated by the lever 32. Such hand control lever 32 is connected for operating a multi-spool hydraulic control valve 33.

In accordance with the present invention, the control valve 33 is mounted to a control console 35 situated at one side of the seat 15. The control console, in turn, is attached in any suitable manner to the support frame 24 of the seat for adjustable movement therewith. Therefore, the hand control lever 32 will remain in a preselected position relative to the operator of the vehicle when the seat is adjustably moved relative to the foot control pedal 30.

As will be appreciated, means must be provided for individually connecting the control valve with a source of pressurized fluid, not shown, and to one or more work implements, such as a boom cylinder, shown at 36 in FIG. 1, so that the valve can effect its control. It will be understood that both the source of pressurized fluid and the implement are located remote from the seat and connected in some manner to the frame 14 of the vehicle so as to require the communication of the fluid between the control valve 33 and the frame 14. However, the control valve is attached to the seat, thus making it movable relative to the frame. Accordingly, the fluid connecting means must be able to accommodate this relative movement.

This is accomplished in a simple and inexpensive manner in the present invention by a plurality of flexible hydraulic hoses 38 which are supported or otherwise connected to the frame at a given location thereon. In the present embodiment, this is accomplished by having one end of each hose connected to a respective one of a plurality of vertically disposed bulk head connectors 40 secured through the floor plate 41 of the frame 14.

The opposite end of each hose is connected to a rearwardly extending hose coupling 42 carried by the control valve 33.

The bulkhead connectors 40 are preferably located a suitable distance behind their respective hose couplings 42 and in longitudinal alignment therewith so as to keep the movement of the respective hose therebetween in a single, vertically oriented plane parallel to the seat 15. Because the connectors 40 are oriented vertically and the couplings 42 are oriented rearwardly, the hoses 38 are arranged in a curvalinear configuration having a substantially 90° bend when the seat 15 is in its lowermost position as shown in FIG. 2. Thus, when the seat is raised to its uppermost position as shown in FIG. 3, the relative movement between the control valve and the frame is accommodated through the change in the bend angle of the hoses. Also, the hoses are preferably stacked together in an equally spaced pattern to minimize any rubbing contact between the hoses so as to alleviate wear.

The higher hydraulic pressures being utilized on today's earthmoving equipment, such as the present excavator vehicle, enhances the possibility of fluid leakage from the components of the hydraulic system, such as the control valve 33. Leakage from the valve 33 is particularly undesirable because such fluid would normally drip onto the floor plate 41 of the frame 14.

To alleviate this problem, a V-shaped drip pan 44 is mounted to the control console 35 underneath the control valve 33. A drain 45 is located at the apex of the pan which has a drain hose 47 connected thereto for carrying off any fluid in the drip pan to an outlet, not shown, below the floor plate 41.

While the present invention has been described and shown with particular reference to the preferred embodiment, it will be apparent that variations might be possible that would fall within the scope of the present invention, which is not intended to be limited except as defined in the following claims.

What is claimed is:

1. A vehicle comprising:
    a frame;
    an operator station selectively positionable relative to the frame;
    foot control means mounted on the frame and operable from the operator station for operably controlling the vehicle;
    hand control means mounted on and operable from the operator station for operably controlling the vehicle and movable with the station relative to the foot control; and
    means mounted on and operable from the operator station for selectively positioning the station relative to the foot control and movable with the station relative to the foot control.

2. The vehicle of claim 1, further comprising:
    a control console mounted on the operator station.

3. The vehicle of claim 2, further comprising:
    a control valve mounted on the console operably connected to the vehicle hand control means; and
    flexible conduit means connected between the valve and the frame for supplying pressurized fluid to the valve.

* * * * *

UNITED STATES PATENT AND TRADEMARK OFFICE
CERTIFICATE OF CORRECTION

PATENT NO. : 4,057,122
DATED : November 8, 1977
INVENTOR(S) : Roy D. Brownell; Dean M. Lawrence It is certified that error appears in the above-identified patent and that said Letters Patent are hereby corrected as shown below:

[57] ABSTRACT:

line 6 - "set" should be --- seat ---.

Signed and Sealed this

Second Day of May 1978

[SEAL]

Attest:

RUTH C. MASON
Attesting Officer

LUTRELLE F. PARKER
Acting Commissioner of Patents and Trademarks